Jan. 24, 1961

J. F. CROSFIELD ET AL 2,969,016

COLOUR PRINTING

Filed March 15, 1956

Inventors
John F. Crosfield
Kenneth B. Morris
Gordon S. J. Allen

By Ralph B. Stewart
Attorney

Inventors
John F. Crosfield
Kenneth B. Morris
Gordon S. J. Allen
By Ralph B. Stewart
Attorney

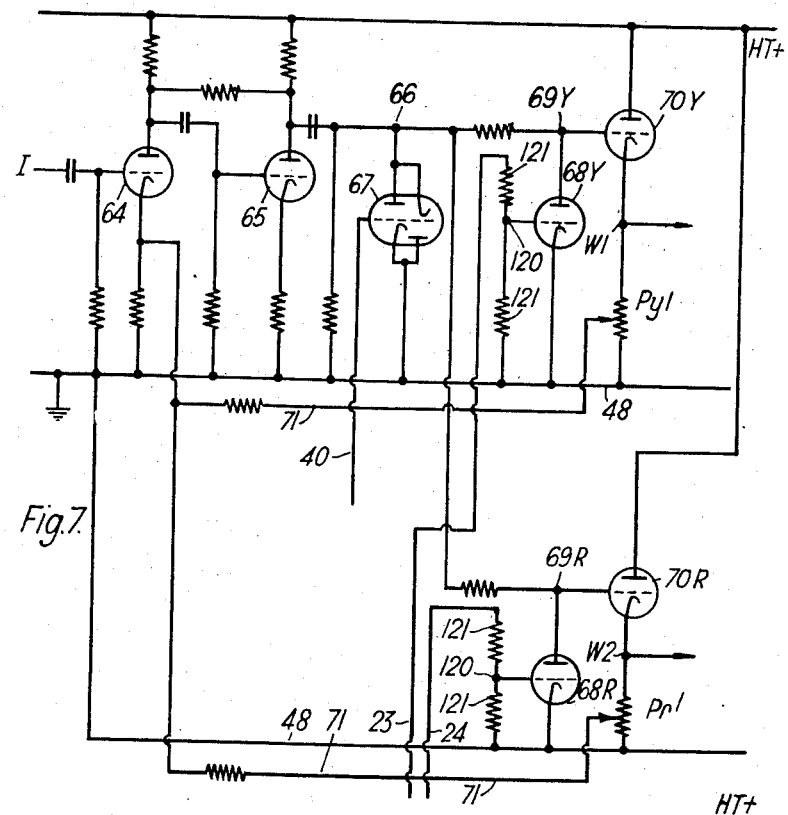
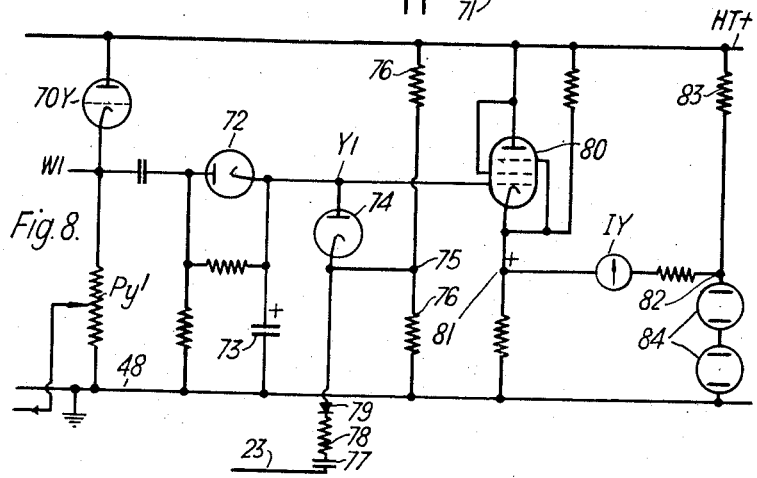

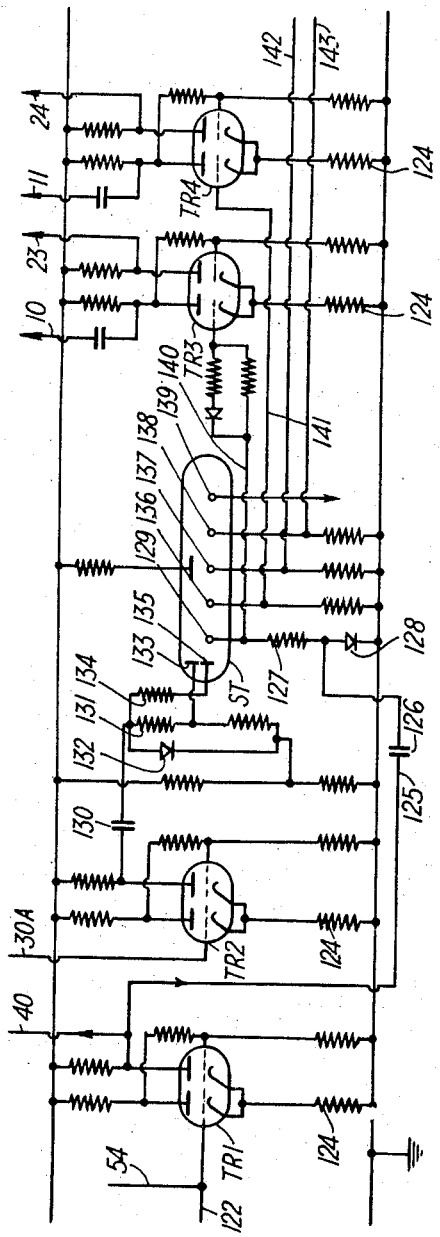

Jan. 24, 1961  J. F. CROSFIELD ET AL  2,969,016
COLOUR PRINTING
Filed March 15, 1956  8 Sheets-Sheet 7
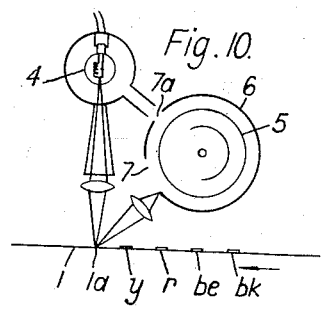
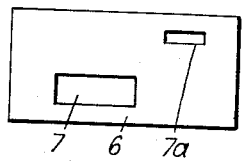
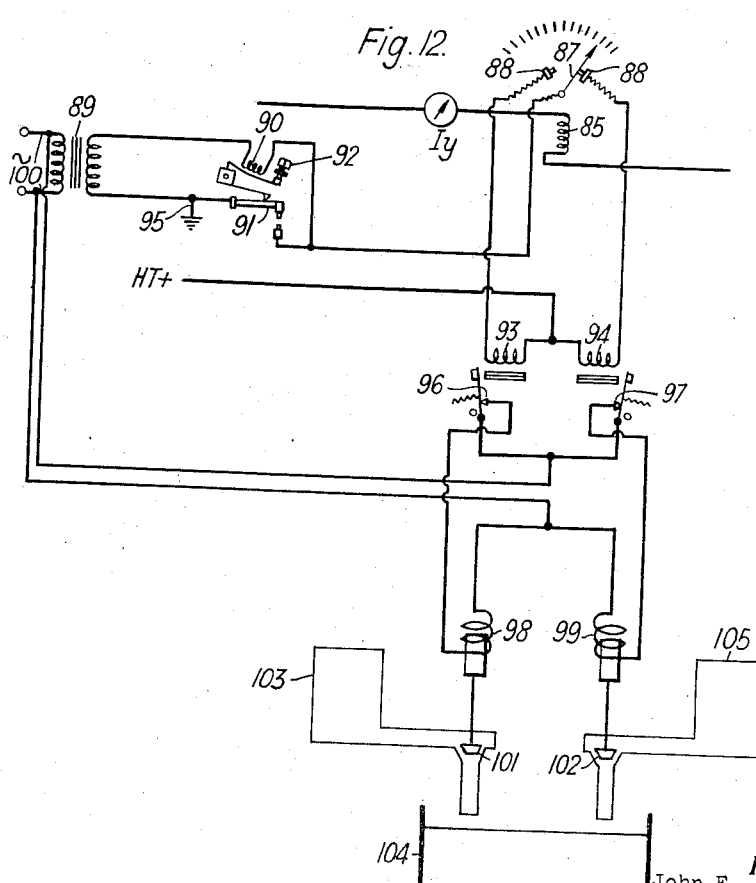
Inventors
John F. Crosfield
Kenneth B. Morris
Gordon S. J. Allen
By Ralph B. Stewart
Attorney Jan. 24, 1961 J. F. CROSFIELD ET AL 2,969,016
COLOUR PRINTING
Filed March 15, 1956
8 Sheets-Sheet 8
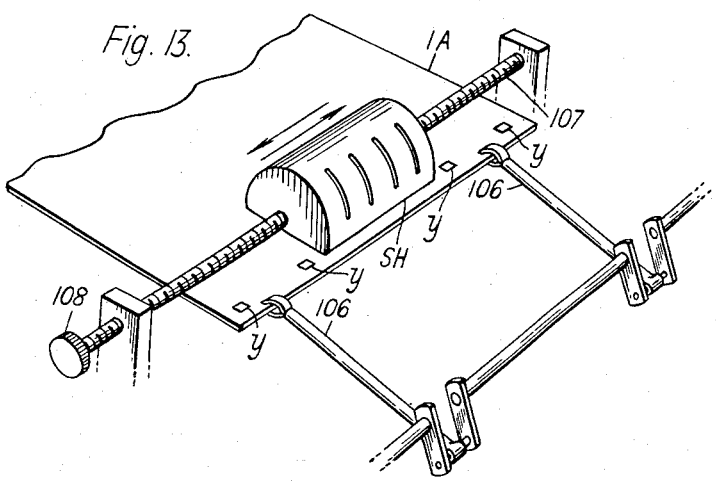
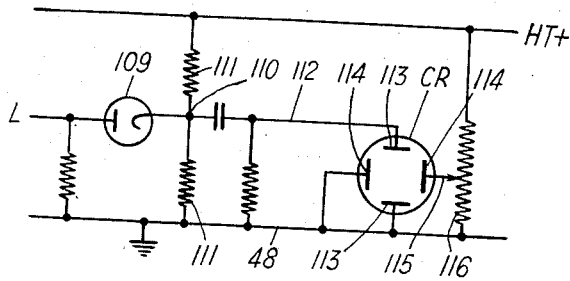
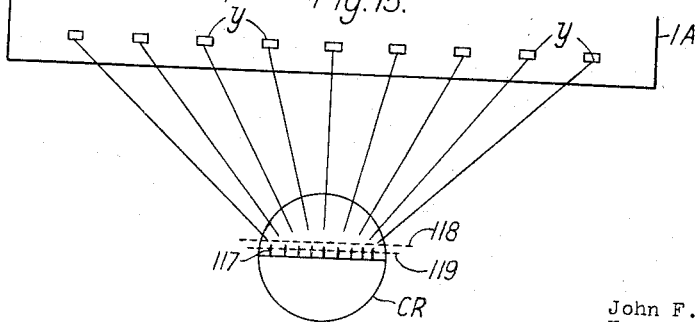
Inventors
John F. Crosfield
Kenneth B. Morris
Gordon S. J. Allen
By Ralph B. Stewart
Attorney

United States Patent Office 2,969,016
Patented Jan. 24, 1961

2,969,016

COLOUR PRINTING

John Fothergill Crosfield, Kenneth Bradley Morris, and Gordon Stanley James Allen, London, England, assignors to J. F. Crosfield Limited, London, England, a British company Filed Mar. 15, 1956, Ser. No. 571,745

Claims priority, application Great Britain Mar. 18, 1955

20 Claims. (Cl. 101—202)

This invention is concerned with monitoring and control apparatus for use with equipment for printing in coloured ink and, in particular, to equipment for multicolour printing. In such printing, in order to obtain a consistently accurate colour reproduction, it is important to ensure that the thickness or density of the ink film deposited by each successive printing cylinder remains substantially uniform. The present method of checking the consistency of the colour reproduction is for the machine-minder to compare a printed copy with a standard copy known as the "pass copy" at regular intervals of time. In doing this, he has to rely on his eye alone and has has no quantitative knowledge of changes in density in the ink and no means of preventing a change in quality until it is sufficiently noticeable for him to be certain of the change, under very difficult conditions. Therefore, not only is the present method not very accurate but it may also entail loss of production brought about by the necessary rejection of all printed copies whose colour reproduction does not come within certain limits of the "pass copy."

The objects of the present invention are to enable much smaller changes to be detected than those seen by the eye and to indicate when a change of quality of the colour reproduction is starting to take place, and to provide quantitative information so that correction can be made either manually or automatically, for example, by appropriately adjusting the quality of the ink before it is applied to the cylinders.

According to the present invention then, each printing cylinder is arranged to print a mark consisting of a small patch of colour, preferably in medium tone, in such a way that the patches appear along a longitudinal or lateral track on the web being printed and are spaced apart by relatively short intervals; the patches are scanned by a photo-electric scanning head after the printing web has passed the last printing cylinder and by measuring the differences in the signal picked up by the photocell, the instrument can monitor or indicate the value of reflection density of a given tone printed on some material in the respective colours. This printing material is usually paper but not necessarily such. By this method, the result of a number of variables is measured and they all operate during the printing process. The output signals from the scanning head are amplified and then switched each to a corresponding indicator. When the press is started at the beginning of a new run, the quality of the coloured inks in the various tanks is adjusted to give the desired overall quality of colour reproduction. Thus the "pass copy" referred to previously is obtained. At this point the readings of the indicators are noted or standardised. Then, as long as the indicator in operation does not depart to any substantial amount from this standard reading, the operator can be sure that the quality of colour reproduction is correct. It should be noted that other factors in the printing process beside the quality of ink in the tanks can affect the resulting colour reproduction. Such factors include variation in pressure of the printing cylinders, changes in condition of the doctor blades or porosity of the paper. It is also possible in employing the invention, to keep the colour densities within predetermined limits by using the signals obtained for control purposes so as, for example, to adjust the quality of the ink; for example, if the ink requires weakening, an ink-reducing medium may be added to the ink tank automatically and if the ink requires strengthening, double-strength ink may be added to the ink tank. The instrument is set up at the time that a reference pass copy is produced, the indicators which may be simple meters, are set to zero and any deviation from the value during the operation will show that the copies being printed depart from the pass copy.

The signals produced by the scanning head apart from the density or quality of the ink, depend on a number of other factors, such as the brightness of the lamp used for illuminating the patches on the web, aging of the photocell in the scanning head, paper dust on the glass cover of the aperture from the scanning head and on a number of other factors which tend to change as time goes on. In order to obtain a relatively high degree of accuracy by the elimination of the effects of these variables, the gain of the amplifier for the signals is preferably automatically controlled by the amplitude of a further pulse from the scanning head which represents the difference in level between white; that is to say, the light reflected from the web in the absence of any colour printing, and black; that is to say, the absence of all light from the photocell. In this way, the signals corresponding to the different patches of colour are all standardised in relation to the known standard signal and the effect of the variables is thus practically eliminated. Thus, if, for example, the sensitivity of the photocell is increased thereby causing the colour signals to become correspondingly greater, the standardising pulses from the scanning head will also become greater by the same amount and thus reduce the gain of the amplifier so that the amplitudes of the amplified colour signals are returned to their original values.

In some cases, for example, if white paper is not being used, the reflected light from the unprinted web may not be satisfactory for producing the white level signal from the scanning head. In such a case, to produce the white level signal, it may be arranged for the lamp which illuminates the patches on the printing web also to pass some light direct to the photocell in the scanning head so that when no light is reflected from the web, the white condition of signal is set up.

Preferably the standardising signal is produced by means of a rotating shutter which surrounds the photocell in the scanning head. For the greater part of each revolution of the shutter, this completely screens the photocell and only allows light to enter the cell just before the arrival of the patches of colour. The difference in illumination between "black" and "white" which is received immediately the shutter is opened, then provides the standardising signal. In addition the shutter serves to "gate" the patches of colour so that the photocell is exposed to dispersed light from the web only in the region of the patches of colour and is screened from the light dispersed from extraneous printed matter occurring between successive sets of patches. The shutter requires to be driven in synchronism with the cylinders of the press, and this may conveniently be achieved by the provision of a synchronous link between the motor driving the press and the shutter. This synchronous link may, for example, take the form of a magslip transmitter driven from the drive of the press, and which in its turn drives a receiver connected to the shutter.

Thus as the shutter rotates to allow the photocell to receive light each time a set of patches of colour passes, so a series of colour signals in the form of voltage pulses is produced and these are then amplified as previously described. After amplification, each pulse requires to be accurately converted to a proportional direct current in order to provide a steady reading of the indicator and for this purpose each pulse is first clamped to a fixed voltage level, for example, earth potential. The pulses are then fed to a gating system, which feeds each pulse separately to its own measuring circuit. For this purpose, each pulse may be fed to a condenser which is charged up to the peak voltage amplitude of the colour pulse applied, and only discharges by a very small amount before the same pulse occurs one cylinder revolution later. This condenser in its turn is connected to a voltmeter, the time constant of the arrangement being arranged so that no noticeable change in output occurs over the working range of the press.

As so far described, the apparatus primarily measures the reflection density of tone of the various patches of colour printed on the web. It is also important, however, that the spectral values of the tones should remain constant and if, as is necessary, the photocell has a fairly broad characteristic, changes in the spectral value of a tone will not, in general affect the output. In order to provide a measure of the spectral values as well as the densities of the different tones, the light illuminating the web may be passed through one of a number of filters each corresponding to one of the coloured inks.

Each filter is chosen to have a spectral response characteristic such that a small change in the colour of the corresponding ink will produce a relatively large change in the light signal received by the photocell. The filters may be mounted on a disc rotated step by step to bring each filter in turn into the operative position. Thus, for example, in a four-colour printing process a disc with eight apertures may be used, four containing colour filters, each corresponding to one of the inks, and four containing no filter, alternating with those containing filters.

The step-by-step motion of the disc, produced for example by a relay operated ratchet mechanism, is slow in relation to the speed of the printing cylinders, for example, one step per ten cylinder revolutions. When the light passes through a clear aperture, the apparatus operates as previously described to give an indication of the densities of the four colours. When it passes through a colour filter, however, the whole waveform will be affected, in particular the one colour to be measured and also the black-to-white pulse which is used for standardising purposes as previously.

The effect on the colours other than that being measured is to render the indications meaningless and, therefore, the channels corresponding to these colours are disconnected to leave only the one channel in circuit at a time, and in addition the signal in this channel is switched from a density measuring meter to a colour measuring meter. The meters in all the channels have circuits with sufficiently long time-constants to ensure that the meters hold their readings during the intervals when they are receiving no signals. Thus at any time it is possible to obtain readings for both the density and the colour of all the inks.

An example of a system in accordance with the invention, for dealing with four-colour printing, for example, in yellow, red, blue and black and certain modifications of the apparatus, will now be described by way of example with reference to the accompanying drawings, in which:

Figure 7 is a diagram of the circuit of the second or pulse amplifier with the clamping circuit and gating for the feed-back potentiometers for two channels only;

Figure 8 is a circuit diagram of the peak voltage measuring circuit;

Figure 9 is a circuit diagram of the triggers and gate pulses generating circuits;

Figure 10 shows diagrammatically an end elevation of a modified form of scanning head;

Figure 11 is a side elevation of the rotary shutter employed;

Figure 12 is a diagrammatic view showing a method of using the instrument for regulating the quality of the ink;

Figure 13 is a perspective diagram showing the application of the invention to sheet-feeding machines;

Figure 14 is a circuit diagram showing a method for using a cathode ray tube for indicating the quality of ink across the whole sheet; and Figure 15 is a diagram of an indicator for use in such a system.

Figure 1:
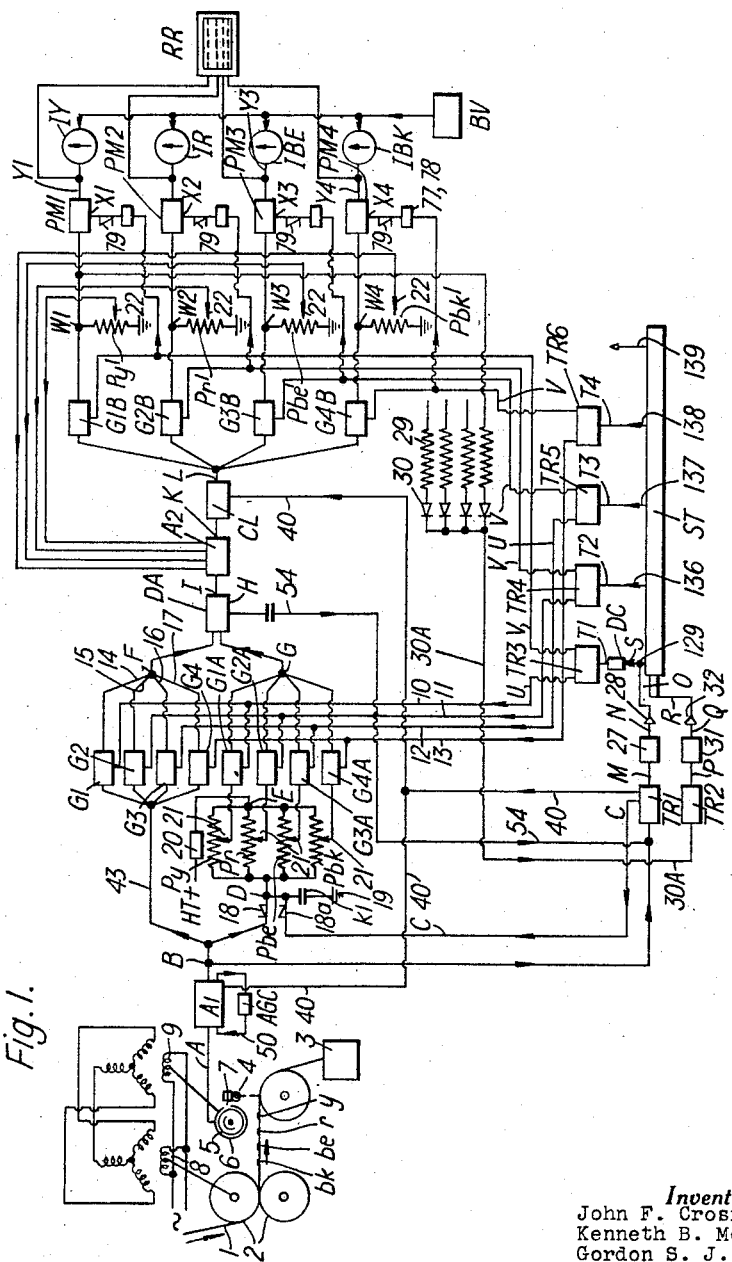
Figure 1 is a block circuit diagram of a complete monitoring system.

The general arrangement and operation of the system may first be described with reference to Figures 1 to 3. In Figure 1, the paper web 1 is shown passing through the last pair of printing cylinders 2, 2 which print with the black ink into the folder 3. A set of patches printed in the different coloured inks on the web is shown at $y$, $r$, $be$, $bk$. The web 1 is illuminated in the neighbourhood of these patches by a lamp 4 which is housed in the scanning head which also contains the photo-electric cell 5. This cell is enclosed in a rotary shutter 6 which has an aperture 7 at one part of its circumference placed so that light reflected from the colour patches $y$, $r$, $be$, $bk$ can pass in succession through the aperture 7 and impinge on the photo-electric cell 5. The shutter 6 is rotated in step with the printing cylinders 2 by a synchronous link consisting of a magslip link, of which the transmitter rotor 8 is driven from the printing cylinders and the receiver rotor 9 is mechanically coupled to the shutter 6. Therefore at one point in each revolution of the printing cylinders 2, the cell 5 is exposed to the light reflected from the colour patches $y$, $r$, $be$, $bk$.

The output from the photo-electric cell 5 is fed through a cathode-follower thermionic stage, not shown but built into the scanning head in a manner similar to that described in British patent specification No. 641,830. The wave-form of the output voltage from the scanning head appearing at A in Figure 1 is of the shape seen at A in Figure 2. It may be mentioned that in Figures 2 and 3, the ordinates $t1$, $t2$ . . . $t7$ represent instants of time during the scanning of the colour patches $y$, $r$, $be$, $bk$. Thus at A in Figure 2, the time $t1$ represents the instant at which the shutter 6 opens and the aperture 7 comes into position to expose to the photocell 5 the part of the paper web 1 immediately in front of the colour patches. Therefore, the voltage level $v\ d$ represents the dark level and the level $v\ w$ represents the white level. Also the pulses $y'$, $r'$, $be'$ and $bk'$ are produced respectively by the light reflected on to the cell 5 by the yellow patch $y$, the red patch $r$, the blue patch $be$ and the black patch $bk$.

The output at A is fed to the first amplifier A1 which is provided with an automatic gain control connection AGC and will be described in more detail below. This wave form is thereby amplified to a medium level at B as indicated at B in Figure 2. The voltage of the waveform B is applied to four gating circuits G1, G2, G3, G4 which will be described in detail later. It may be mentioned here, however, that each receives a square positive gating pulse by way of the conductors 10, 11, 12, 13 respectively as seen at U in Figure 2 and having the durations $t2$—$t3$, $t3$—$t4$, $t4$—$t5$ and $t5$—$t6$. These pulses open the gates for those time periods with the result that the individual colour pulses appear in the conductors 14, 15, 16 and 17 and are united at the junction point F so that the wave-form of voltage at that point is as seen at F in Figure 2. It will be appreciated, of course, that the wave-form at F is also produced if the four gates G1, G2, G3 and G4 are replaced by a single gate suitably pulsed. However, the gates G1, G2, G3 and G4 are introduced into the circuit because they form symmetry with gates G1A, G2A, G3A and G4A which are to be described later; thus assisting in maintaining the accuracy of the arrangement over long term periods.

The voltage at the point B is also applied to the input of a Schmitt trigger TR1 serving as a sequence trigger and details of the connections of which will be given later. The input to TR1 also receives the output of a difference amplifier DA which will be referred to again later on. This output, however, has a wave-form as shown at H in Figure 2. The sum of the wave-forms B and H is a square wave of a width of the time period $t1$–$t7$ and it is applied to the first grid of the sequence trigger TR1. The output from the first anode of the trigger TR1 at the point C is a square wave of the shape seen at C in Figure 2.

The voltage at the point B is further applied through a half-wave rectifier 18 at the point D to the upper plate of a condenser K1, the other plate of which is earthed at 19. While the rotary shutter 6 is closed and the web 1 not exposed to the photocell 5, the condenser K1 is charged up to a potential between the dark and white levels ($v\ d$—$v\ w$), by wave form C applied through a second half-wave rectifier 18a. When the shutter 6 opens and the voltage B appears, the upper plate of the condenser K1 falls in potential to very nearly $v\ w$, and the time constant of the discharge path is long enough to prevent each individual colour pulse $y'$, $r'$, $be'$, $bk'$ from recharging the condenser K1 so that the potential at the point D takes the wave-form as shown at D in Figure 2.

The voltage at D is applied to the left-hand end of four potentiometers P$y$, P$r$, P$be$ and P$bk$, which control the respective colour channels. A stabilised steady positive potential of approximate level $v\ w$ is applied to the other ends of the potentiometers at the point E as seen at E in Figure 2 so that the potential drops in the potentiometers are the difference between the voltages at D and E. The potential at E is derived from the high tension supply at HT+ through a stabilising triode 20. The adjustable contacts 21 of the four potentiometers are ganged with the adjustable contacts 22 of four further potentiometers P$y'$, P$r'$, P$be'$ and P$bk'$, the purpose of which will be described later. The effect of the potentiometers P$y$, P$r$, P$be$ and P$bk$ will also be described in detail below but the potentials from their adjustable contacts 21 are applied to four further gates G1A, G2A, G3A and G4A which are similar to the gates G1, G2, G3 and G4 and are controlled by the same gating pulses in the conductors 10, 11, 12 and 13. The result is that the voltage at the junction point G has a wave-form as shown at G in Figure 2.

The voltages F and G are applied to the respective control grids of a difference amplifier DA which will be dealt with in detail later but comprises two triodes coupled by a common cathode resistor. The output of the amplifier DA which appears at I corresponds to the difference between the voltages at F and G and is indicated at I in Figure 2. It will be observed that the wave-form consists only of pulses corresponding to the colour pulses $y'$, $r'$, $be'$ and $bk'$ (Figure 2–A).

Figure 2:
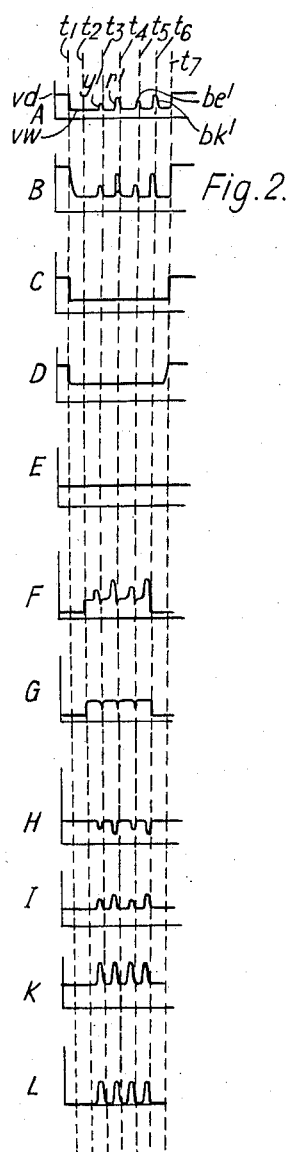
Figure 2 is a diagrammatic-showing of wave forms of voltage at various points in the main chain.
Figure 3:
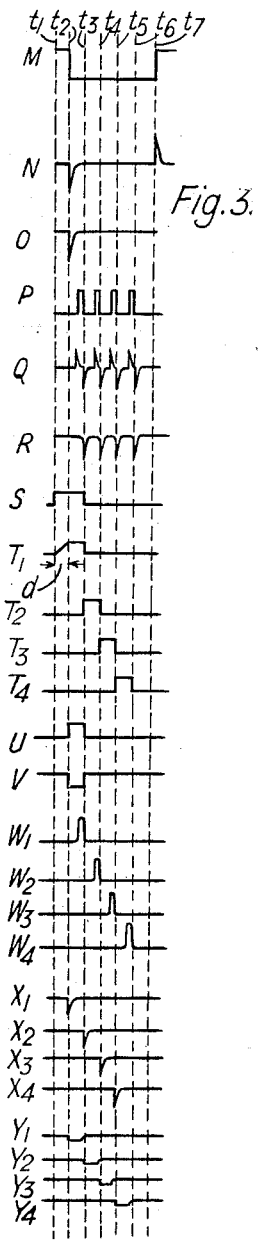
Figure 3 is a similar diagram of further wave forms at other points in the chain, and in particular in the control or gating circuits.

These pulses are brought up to full level in a second amplifier A2 in the output of which at K, the colour pulses appear all of the same amplitude as seen at K in Figure 2. This result is produced by the action of four further gates G1B, G2B, G3B and G4B and feed-back to the amplifier A2 from the potentiometers P$y'$, P$r'$, P$be'$ and P$bk'$ already mentioned. The gates G1B, G2B, G3B and G4B are controlled by gating pulses in conductors 10, 11, 12, 13 but of negative sign as shown at V in Figure 2. Thus the outputs from the gates G1B, G2B, G3B and G4B at the points W1, W2, W3 and W4 are as shown at W1, W2, W3 and W4 in Figure 2. These pulses are applied to the potentiometers P$y'$, P$r'$, P$be'$ and P$bk'$ and a proportion of each of these voltages is taken off at the contacts 22 and fed back to the amplifier A2 each bringing the pulse of the corresponding colour in the output of the amplifier A2 up to the amplitude as seen at K in Figure 2. The adjustment of the potentiometers P$y'$, P$r'$, P$be'$ and P$bk'$ will be referred to below.

The output from the amplifier A2 is clamped to earth potential in a clamping unit CL which consists of a double triode circuit which will be described in greater detail later. The output at the point L has the form seen at L in Figure 2.

The pulses of the respective colours appearing at the points W1, W2, W3 and W4 are then each applied to a peak voltage measuring circuit PM1, PM2, PM3 and PM4 of which details will be given later. However, it may be stated here that in each channel a potential corresponding to the colour pulse is established by an electrometer pentode and is applied in opposition to a stabilised positive potential produced in a unit BV, to a centre-zero voltmeter IY, IR, IBE or IBK which serves as the indicator. When the printing press is started at the start of a run, and the colour reproduction has been adjusted to obtain the "pass copy," the output potential corresponding to each colour pulse set up is adjusted by setting the appropriate potentiometer P$y'$, P$r'$, P$be'$ or P$bk'$ until it exactly balances the stabilised positive potential and the voltmeter IY, IR, IBE or IBK reads at its zero. Then during the continued operation of the press, any deflection of the respective voltmeter gives an immediate quantitative indication of departure of the quality of the colour printing at each cylinder.

In Figure 1, the output of the instrument is also shown connected to the four elements of a four-track recorder RR which produces record tracings showing variations in the qualities of the four colours employed.

As regards the gate control circuits, the sequence trigger TR1 which produces square waves of the width $t1$–$t7$ has already been referred to. It also supplies square waves of the same width to the clamping unit CL and also, for a purpose to be explained later, to the first amplifier A1. Furthermore, a negative square wave of the same width is taken off at the point M, the wave being shown at M in Figure 3. It is differentiated in the unit 27, the output at the point N having the form shown at N in Figure 2. The positive pulses are clipped off by a rectifier 28 to leave a sharp negative pulse at O as seen at O in Figure 2 at the instant $t1$ in each exposure period and the negative pulse is applied to the first cathode of a cold cathode selector tube ST. A five-way tube ST is shown since four gating pulses are required, one for each colour, and a "rest" condition is necessary. At the present time, however, ten-way tubes are more readily available and may be used by strapping five of the cathodes together so that they act as a single cathode.

A second Schmitt trigger TR2 is provided to serve as a switching trigger. The input to it is taken from the four points W1, W2, W3 and W4 in each case through a resistor 29 and contact rectifier 30 and conductor 30A and therefore consists of four positive pulses occurring at the times $t3$, $t4$, $t5$ and $t6$. The output pulses at P are as at P in Figure 2 and are differentiated in the unit 31 resulting in sharp pulses as seen at Q and the positive pulses clipped off by a rectifier 32 to leave the negative pulses at R as seen at R in Figure 2 which are applied to the switching or stepping terminals of the selector tube ST. At each of the negative pulses, the discharge in the tube ST is stepped on from one of its cathodes to the next. Thus the tube ST is struck at the time $t1$ and is stepped on at the times $t3, t4, t5$ or $t6$.

The cathodes of the selector tube ST deliver respectively into four further Schmitt triggers TR3, TR4, TR5 and TR6, the first cathode by way of a delay circuit DC. This delay is provided because the wave-form derived from the photoelectric cell 5 does not come down to the white level immediately the shutter 6 opens but at the foot comes to the white level in a curve. It is not desired for the trigger TR3 to operate until the white level has been reached. The outputs from these four triggers are taken off at U and V from the two anodes of each trigger and have the shapes shown at U and V in Figure 2.

Figure 4:
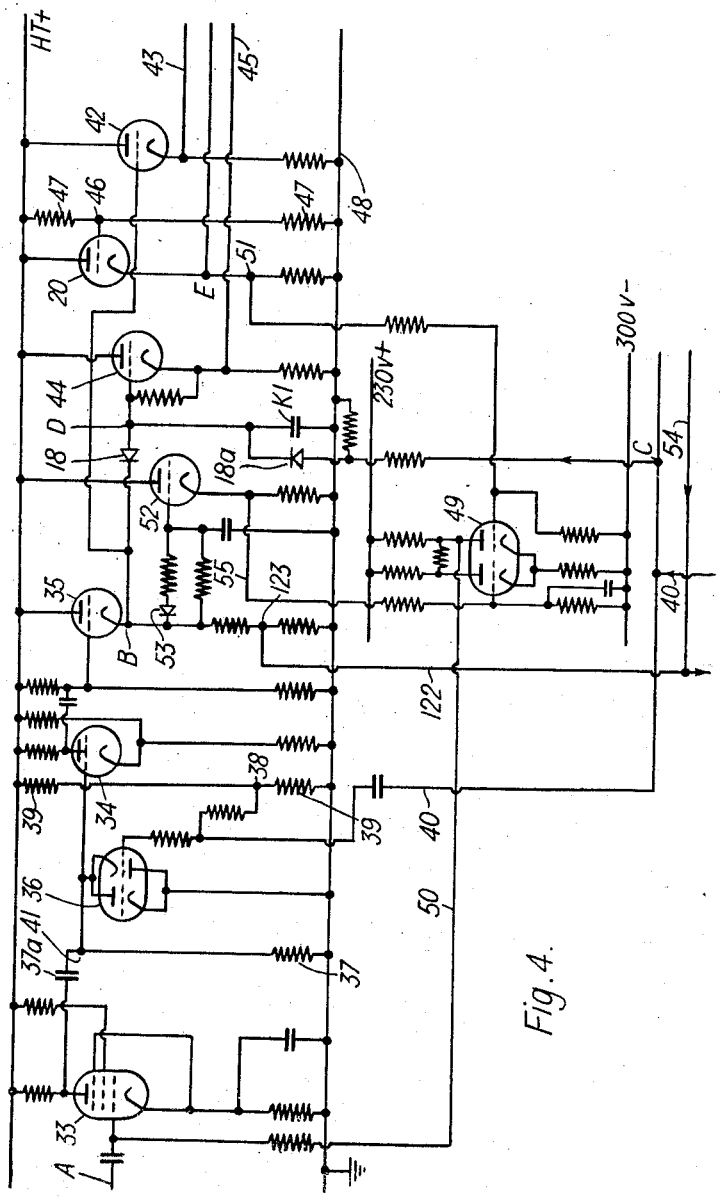
Figure 4 is a circuit diagram of the first amplifier and the automatic gain control connections.

The main components used in the system will now be described in greater detail. The first amplifier A1 with its connections and the automatic gain control arrangement is shown in Figure 4. The input at the point A is the output from the scanning head containing the photo-electric cell 5. The amplifier consists of a pentode 33, resistance-capacity coupled to a triode 34 which in turn is coupled to another triode 35 connected as a cathode-follower stage. The point B in the cathode circuit of the triode 35 is the same as the point B in Figure 1.

A double triode 36 is connected across the coupling resistor 37 between the pentode 33 and the triode 34. The two halves are connected cathode to anode and the two grids are connected together. The grids are biassed from a point 38 in a potential divider 39 connected across the source of anode supply and also receive the negative pulses of the shape shown at C in Figure 2 by way of the conductor 40. Thus, in the periods between exposures when the rotary shutter 6 is closed, the double triode 36 is rendered conductive by the positive potential from the point 38 and the coupling resistor 37 is shunted so that the time constant of the coupling capacitor 37a and resistor 37 is reduced. Thus the potential at the point 41 is maintained even if there is a change in the automatic volume control due to a change in the general conditions, for example, the illumination from the lamp 4. Such changes are, of course, quite slow. The system has frequently to operate when the speed of the printing cylinders 2 is relatively quite slow and then during exposures, the time period of the capacitor 37a and resistor 37 must be long; then, of course, the double triode 36 is cut off by the negative pulse from the pulse at C and the coupling resistor 37 is then effective. The voltage of the wave-form at B is applied to the gates G1, G2, G3 and G4 (Figure 1) through another triode 42 connected as a cathode follower and the conductor 43.

The rectifiers 18 and 18a and the condenser KI are connected to the point B as in Figure 1 and the voltage at the point D is applied to one end of the potentiometers Py, Pr, Pbe and Pbk through a cathode-follower amplifier triode 44 and conductor 45. The triode 20 for providing the stabilised direct current potential at the point E is connected as in Figure 1, its grid being connected to a point of positive potential at the point 46 in a potential divider 47 connected between the stabilised positive line HT+ and the earth line 48.

The automatic gain control connection contains a double triode amplifier 49, the output of which is fed to the control grid of the pentode 33 through the conductor 50. The right-hand grid of the double triode 49 is supplied with a constant positive potential from a point 51 in the cathode circuit of the stabiliser triode 20 while its left-hand grid is supplied with a potential which is proportional to the difference between the voltage levels of the black and white signals. This voltage, of course, only changes when the general conditions at the scanning head change. This potential of the left-hand grid is derived from the cathode load of yet another cathode-follower triode 52, the grid of which is supplied with the voltage at the point B through a rectifier 53, through the conductor 55.

Figure 5:
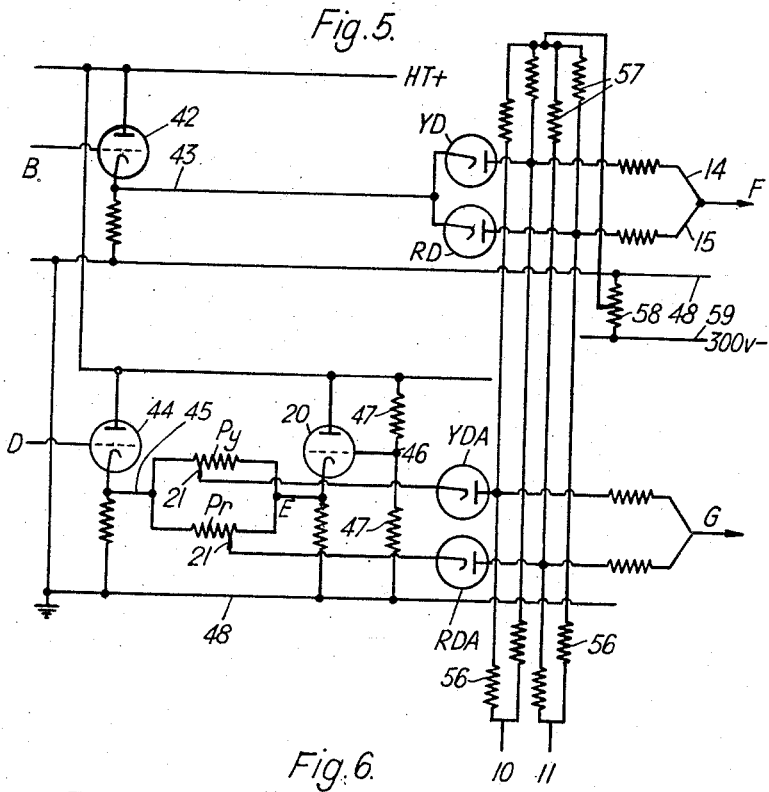
Figure 5 is a diagram of the gating and compensating circuits showing, however, two channels only for simplicity.

In Figure 5, the connections are shown of the gating and compensating circuits but only two channels, for example, the yellow and red channels, are shown in order to simplify and clarify the diagram. The triodes 20, 42, 44 again appear and are connected as in Figure 4. The voltage of the wave-form B (Figure 2) is applied by the conductor 43 to the cathodes of the diodes YD and RD of the yellow and red channels and the positive gating pulses U as already described are applied from conductors 10, 11 through resistances 56 to the anodes of the diodes YD and RD. A steady negative biassing potential at the potential divider 58 is arranged with resistances 57 so that those anodes are normally at a potential somewhat below that of the white level signal. The potential divider 58 is connected between the earth line 48 and a negative line 59 at −300 volts. Thus when there is no output from the scanning head, the diodes YD and RD are not conductive. Each gating pulse, however, brings the anode potential of the respective diode up to the white signal level and the positive colour pulses in the input B cause the anode potential to rise and follow that of the cathode during the gating pulse due to the action of the high resistances 56 and the low impedance of the diodes and output impedance of the triode 42. Thus the colour pulses are reproduced in the conductors 14, 15 and at F, add up to yield a wave form as seen at F in Figure 2. The gating pulses act in a similar way on the other diodes YDA and RDA but the input at D has the form shown at D in Figure 2 and the output at G has the form shown at G in Figure 2.

The adjustable contacts of the potentiometers Py and Pr, as already explained, are ganged to those of the potentiometers Py' and Pr' which are set manually to balance the standard voltages at the voltmeters 11, 12. When these potentiometers Py', Pr' are set up in this way, the potentiometers Py and Pr are also set to a corresponding position. The potential drop in each potentiometer resistance is the difference between the signal voltage at 45 at any time and the steady positive potential at E. If the amplitude of the wave form B goes up or down at any time due to alteration in the conditions such as severe ageing of the photo-electric cell 5 or drift in the A.G.C. circuit, the voltages across the potentiometers Py and Pr go up or down in accordance, but only a proportion of this change is taken off at their moving contacts. Considering one colour only, the proportion depends on the setting of the moving contact, which is decided by the original amplitude of the pulse derived from that colour at the scanning head, since the moving contact is ganged with that of the other potentiometer as first described. In this way it is arranged that should the overall wave-form at B change by a certain amount, the full amount of that change is felt by the left-hand grid of the difference amplifier, but only a certain proportion is felt by the right-hand grid. Thus the overall amplitudes of the colour pulses as seen at I are kept constant.

Figure 6:
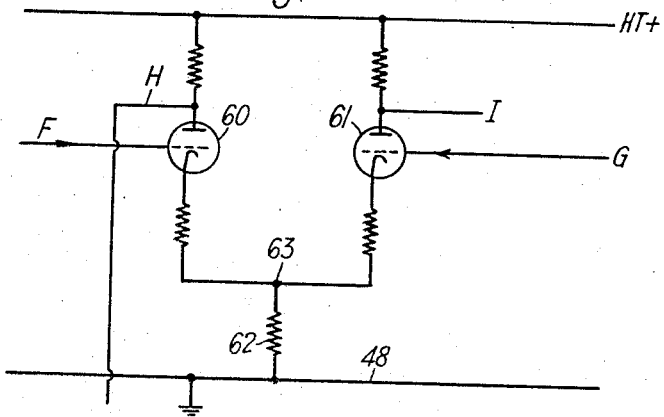
Figure 6 is a circuit diagram of the difference amplifier.

The connections of the difference amplifier are shown in Figure 6. It includes two triodes 60, 61 coupled together by a resistor 62 common to their cathode circuits. The inputs having the wave-forms as obtained from the gating unit shown in Figure 5 are applied to the respective grids of the triodes as shown at F and G. The output taken from the anode of the triode 60 at H and that from the anode of the triode 61 at I corresponds to the difference between the inputs F and G and have respectively the wave forms shown in H and I in Figure 2.

Clearly, any change, for example, an increase in the input voltage at F results in a corresponding change in the current flowing through the resistor 62 and in the potential at the junction 63. Therefore the potential on the cathode of the triode 61 rises. If a similar change in the input at G to the grid of the triode 61 occurs, the difference between the potentials of the grid and cathode of the triode 61 remains the same and there is no change in the output at I.

The second or pulse amplifier A2 shown in detail in Figure 7 has two triode stages 64, 65 resistance-capacity coupled. The input at I consists of the colour pulses only as seen at I in Figure 2. The output point 66 is connected to the earth line 48 through a double triode 67 which acts as a clamp. The two halves are connected cathode to anode and the two grids are directly connected together and receive pulses from the sequence trigger TRI through the conductor 40 so that between exposure periods when the rotary shutter 5 is closed, the grids of the triode 67 are at positive potential and the triode 67 is conductive and holds the point 66 at earth potential. On the other hand, during exposures, the grids of the triode 67 receive the negative pulses so that the triode is open-circuited and the output from the triode 65 passes on to the gating triodes 68Y and 68R and voltage appears at the points 69Y and 69R, when the negative gating pulses arrive at the grids of the triodes 68Y, 68R through the conductors 23, 24 as already explained with reference to Figure 1. Actually, the grids of the triodes 68Y, 68R are connected to points 120 in potential dividers 121 connected between the earth line 48 and the conductors 23, 24. The values are such that in the absence of the negative gating pulses, the points 120 are sufficiently positive to render the triodes 68Y, 68R conductive. When the gating pulses arrive, they make the upper ends of the dividers 121 negative so that the potential at the points drop sufficiently to cut off the triodes 68Y, 68R. The individual colour pulses are then applied to the grids of triodes 70Y, 70R connected as cathode followers and are reproduced in their cathode circuits at W1 and W2.

The potentiometers Py′ and Pr′ are connected in the cathode circuits of the triodes 70Y, 70R and provide adjustable negative feedback through the conductors 71 to the cathode circuit of the triode 64 to bring the output pulses at W1, W2 to equal amplitudes as already mentioned and as shown at W1 and W2 in Figure 2.

The individual pulses thus obtained are then each passed on to a peak voltage measuring circuit which is shown in detail in Figure 8 for one channel, say, the yellow channel. The output from the triode 70Y at W1 is arranged to charge through a diode 72, a condenser 73 to the peak voltage of the incoming colour pulse. A second diode 74 is placed in a discharge path for the condenser 73 but is prevented from conducting under normal conditions by a positive potential applied to its cathode from a point 75 in a potential divider 76 connected across the high tension line HT+ and the earth line 48. However, it is arranged for so called "dunking" pulses to be applied to the cathode of the diode 74 at Y1 at the times t2. These pulses are produced by differentiating the square-wave pulses V in the conductor 23 by a condenser 77 and resistance 78 and clipping off the positive sharp pulses by a rectifier 79 leaving the negative sharp pulses X1, X2, X3, X4 as shown in Figure 3 in the respective channels. The result is that as each dunking pulse arrives on the cathode of the diode 74 at the time t2, the condenser discharges a small amount through the diode 74 so that the voltage at the point Y1 takes the form Y1 seen in Figure 3. The other three channels act similarly at the timed instants as shown at Y2, Y3 and Y4 in Figure 3. The condenser 73 is recharged on the arrival of the next colour pulse.

The voltage at the point Y1 is applied to the input grid of a pentode 80 connected as a cathode follower to act as an electrometer tube. The positive potential at the output at 81 varies with the peak value of the colour pulse and can be adjusted by adjusting the potentiometer Py′.

A stabilised positive potential is taken from a point 82 in a potential divider connected across from the positive line HT+ to the earth line 48 and consisting of a resistor 83 and a pair of reference voltage discharge tubes 84. The points 81, 82 are connected together through a centre-zero voltmeter IY which therefore reads zero if the potential at 81 is equal to that at 82. In fact, on starting the printing press, the quality of the ink is standardised and the potential at 81 adjusted until the voltmeter reads zero. Then if the quality of the colour reproduction departs from the standard in either direction, it will be immediately indicated on the voltmeter IY and the operator can strengthen or weaken the ink accordingly without stopping the press.

The detailed circuits of the arrangement for producing the gating or timing pulse are shown in Figure 9. The input to the first or sequence trigger TR1 as already mentioned passes from the difference amplifier DA by the conductor 54 and from the point B by the conductor 122. As seen in Figure 4, the conductor 122 leads from a point 123 in the cathode circuit of the triode 35 such that the amplitude of the voltage from the point B is reduced to suit that from the amplifier DA and the input to the trigger TR1 has the form of a negative wave extending from the time t1 to t7.

The triggers TR1 . . . TR6 are connected as ordinary Schmitt triggers, each with its two triodes coupled by a common cathode resistance 124. Therefore the output from the second anode of the sequence trigger TRI has the form of a negative square wave as shown at C in Figure 2. It is applied through the conductor 40 as already mentioned to the grids of the clamping triode 67. The output also passes by a conductor 125 to the combination of condenser 126, resistance 127 and rectifier 128 which carries out the functions of differentiating and clipping the positive pulses as described for the components 27, 28 in Figure 1. The remaining negative pulses pass to the first cathode 129 of the selector tube ST.

The input to the second or switching trigger TR2 applied by the conductor 30A consists of four successive positive pulses as already explained. The output at the right-hand anode of the trigger consists of four square pulses as seen at P in Figure 2. These are rectified and the positive half waves clipped by the combination of condenser 130, resistance 131 and rectifier 132 which constitute the components 31, 32 in Figure 1. Thus the remaining sharp negative pulses are applied to one starting electrode 133 of the selector tube ST and also with some delay provided by a resistance 134 to the other starting electrode 135.

By this arrangement, the discharge in the tube is initiated and is switched from the cathode 129 to the other cathodes 136, 137, 138 and 139 in succession. This takes place when the shutter 6 opens and at the respective times t3, t4, t5 and t6. The discharge rests at the cathode 139 during the time that the shutter 6 is closed and is transferred to the cathode 129 once more when the shutter opens.

The cathodes 129, 136, 137 and 138 are connected respectively to the first grids of the four pulse generating triggers TR3, TR4, TR5 and TR6 by conductors 140, 141, 142 and 143 so that the gating pulses appear at their anodes and are taken off by the conductors 10, 11, 12, 13 and 23, 24, 25, 26 to the different gates as already explained.

Sometimes colour printing has to be carried out on a material such as metal foil, cellophane or other uniformly coated material whose surface will not reflect light to give a satisfactory white signal level. A form of modified scanning head to overcome that difficulty is shown in Figures 10 and 11. In those figures as in Figure 1, the photoelectric cell is shown at 5, the rotary shutter at 6 and the lamp serving as the source of illumination at 4. However, in addition to the aperture slot 7 through which the light reflected from the colour patches y, r, be and bk passes to the cell 5, the shutter 6 has a further aperture 7a through which a certain amount of light can pass directly from the lamp 4 to the cell 5. This occurs just before the first patch *y* passes the main spot of light at 1*a* on the web 1. It will be noticed from Figure 11 that the two apertures 7, 7*a* are at different points along the axis of the shutter 6 so that the light intended to pass through one of the apertures cannot pass through the other at any time in the revolution of the shutter 6.

It has already been mentioned that the system may be modified to control automatically the quality of the ink employed. One mode of effecting that result suitable for use in gravure or intaglio printing is shown diagrammatically in Figure 12. In series with the voltmeter I*y* is the coil 85 of a voltmeter relay, the contact arm 87 of which takes up a position corresponding to that of the pointer of the voltmeter I*y*. This relay has two adjustable stationary contacts 88 and according to their setting, the arm 87 makes contact on the one or other side when the quality of the ink deviates one way or the other from the standard quality by a predetermined amount. A circuit from a mains transformer 89 contains the heater 90 of a bi-metallic cycling switch 91 which is slow acting so that its circuit is only allowed to operate periodically and thus sampling the density information. An adjusting screw 92 is provided to set the time period of the cycling switch 91. The latter is also in a circuit from the high tension supply at HT+ through the winding of one or other of two relays 93, 94, one of the contacts 88, the arm 87 to earth at 95. Thus if a contact 88 closes, then as soon as the cycling switch 91 closes its contacts, one of the relays 93 or 94 is energised and closes its contacts 96 or 97. As a result of this, one of two solenoid coils 98 or 99 is energised across the alternating source 100 and the corresponding valve 101 or 102 is opened. The valve 101 admits ink of double strength from a tank 103 into the ink duct 104 of the printing press while the valve 102 admits ink reducing medium from a tank 105. Thus the ink used for printing is brought back to the standard quality.

In the case of letter press printing, the density of ink printed depends upon the speed of the inking roller. In order to correct the printing density automatically in such a case, in accordance with the invention, the deviation of the voltage given by the indicators IY, IR, IB*e* or IB*k*, is applied to vary the speed of the inking roller, for example, by adjusting a variable speed gearing.

In lithographic printing, the density of ink printed may be varied by a change in either the water or the ink reaching the printing surface or by changing the pressure of air blown over the printing surface. Either of these variables may be used as a means of density control in such a process.

By appropriate arrangement of the mounting of the scanning head, the invention can be applied to a sheet-feed printing press. An example of this is illustrated in Figure 13 adapted to test patches of ink of one colour spaced across the whole width of a paper sheet. The paper sheet leaving the machine is shown at 1A and is printed with small patches *y* of colour say in yellow ink, lying in a transverse row across the end of the sheet 1A. The gripper arms are seen at 106. The scanning head SH is shown traversed across the sheet and back to scan the patches *y* by a lead screw 107 engaging a nut in the scanning head. The screw 107 is driven through a spur wheel 108 in such a way that the scanning head SH dwells at each patch *y* to scan the individual patches.

A modified form of indicating system particularly suitable for use with the apparatus shown in Figure 13 will now be described with reference to Figures 14 and 15. The signal pulses corresponding to the patches *y* in Figures 13 and 15 taken, for example, from the point L in Figure 1 are applied at L in Figure 14 to the anode of a diode 109. In order to increase the facility of reading the indications, only the upper tips of the individual pulses are passed to the indicator. Thus a steady positive potential somewhat less than the peak voltage of the colour pulses is applied to the cathode of the diode 109. The steady potential is obtained from a point 110 in a potential divider 111 connected between the high tension line HT+ and the earth line 48. Thus the diode 109 only becomes conducting when the incoming colour pulse exceeds in amplitude the positive potential at the point 110. Furthermore, only the upper tips of the colour pulses pass through to the output conductor 112. This output representing the tips of the colour pulses is applied between the Y-plates 113 of a cathode ray tube CR. The X-plates 114 of that tube are connected between the earth line 48 and the slider 115 of a potentiometer 116 connected across the high tension line HT+ and the earth line 48. Moreover, the slider 115 is driven in step with the travel of the scanning head SH across the paper (Figure 13).

The result of this is shown in Figure 15 where the end of the paper sheet 1A is shown with the colour patches *y* and marks 117 appear on a persistent screen of the tube CR to correspond to the tips of the colour pulses obtained as the scanning head SH is moved across the sheet 1A. The lines 118, 119 are permanent lines on the screen and indicate the permissible high and low values of the tips of the colour pulses. It is clear that the press-minder can see immediately if the quality of the ink passes beyond the permissible limits by noting that the upper ends of the marks 117 lie above the line 118 or below the line 119.

In a modification of this last-described arrangement, the output from the amplifier A1 subject to the automatic gain control connection A.G.C. may be applied to the Y-plates of a cathode ray tube. This output may be taken from the point B in Figures 1 and 4 and then the cathode ray tube displays a wave form as shown at B in Figure 2. In order to increase the ease and accuracy of reading the peaks of the colour pulses, the wave form may be set up to a relatively large scale on the cathode ray screen and the Y-plates of the tube biassed to bring the peak portions of the wave form substantially to the horizontal mid line on the screen.

In some cases, in continuous web feed printing presses, it is not permissible to print the colour patches in sequence to form a track extending in the direction of travel of the web, for example, in magazines in which there is no margin to be subsequently cut away. Then the colour patches may be placed to extend in a line running across the web, that is at right angles to the direction of the travel of the web.

In such cases, a modified form of optical system is provided in the scanning head. Thus in order to establish colour pulses in the output signal from the photo-electric cell in sequence as already described, a number of scanning spots of light, say four spots in the case under consideration, are arranged on the web along a line which is inclined at an angle, for example, 45 degrees to the direction of travel of the web. These scanning spots are so spaced that each spot passes over its own colour patch only and the time of scanning each patch is the same as already described with reference to Figure 1. The four scanning spots are produced from a single lamp by means of a composite lens system comprising four elements each producing one of the scanning spots.

In order to ensure that the reflected light from each scanning spot shall fall on the photo-electric cell only while the spot is passing over its associated colour patch, a second lens system is employed comprising four elements similar to those just mentioned by lying along a line which runs at 45 degrees to the plane of the moving web as well as at 45 degrees to the direction of travel of the web so that they respectively collect reflected dispersed light from the four scanning spots. The second lens system is arranged so that its four elements form images slightly separated circumferentially around the rotary shutter. In this case, the shutter is provided with four exposure slits, placed so that each slit passes the image of the respective scanning spot during the time that the spot in question is passing over the respective colour patch.

Thus the photo-electric cell yields an output similar to that shown at A in Figure 2 so that the remainder of the system may be the same as that already described with reference to Figures 1 to 9.

We claim:

1. An apparatus for indicating changes in the quality of colour reproduction in printing with ink of at least one colour, comprising a scanning head, including a photoelectric cell which scans patches of the ink on a printed surface to give an output signal which represent the reflectance of the patches but which may also be affected by changes in factors unrelated to the reflectance of the said patches, exposure control means for additionally exposing said photoelectric cell to two different standardising light intensities, at least one of which varies in accordance with changes in at least one of the said unrelated factors, whereby the output of said photoelectric cell includes, in addition to the signal corresponding to the said ink patches, two signals of different values representing the said two different light intensities, the difference between the two values including variations due to changes in said one unrelated factor, control means for deriving from said two standardising signals a control signal varying in accordance with their difference, an amplitude compensating circuit receiving the output signal from said photoelectric cell and having means whereby the amplitude of the part of said signal corresponding to the ink patches is varied by means of said control signal to remove from the signal which corresponds to the ink patches the variations due to changes in the said one unrelated factor, and an electrical indicator connected to respond to the output of said control circuit so as to indicate changes in the quality of colour reproduction.

2. An apparatus according to claim 1, further comprising an electric controller for sampling the output of said control circuit at predetermined intervals, and ink control means operated by said electric controller following a sampling operation to adjust the characteristics of the ink employed to restore the quality of colour reproduction to within predetermined limits.

3. An apparatus according to claim 1, for use with a moving web on which are printed a series of colour patches extending along a line running transverse to the direction of movement of said web, the scanning head including an optical system which causes the said patches to be scanned by spots of lights in sequence, a rotary shutter, and means for driving said shutter in step with the movement of said web to admit an image of each scanning spot to the photoelectric cell during the time that the respective scanning spot is passing over its associated colour patch.

4. An apparatus according to claim 1, in which the indicator employed is a cathode ray tube.

5. An apparatus for indicating changes in the quality of colour reproduction in printing with ink of at least one colour, comprising a scanning head including a lamp and a photoelectric cell which scans patches of the ink on a printed surface illuminated by the lamp to give an output signal which represents the reflectance of the patches but which may also be affected by changes in factors unrelated to the reflectance of the patches, exposure control means for additionally exposing said photoelectric cell at different times to a first standard light source of low intensity and to light which originates from said lamp but reaches said photoelectric cell without modification by reflection from an ink patch, whereby the output of said photoelectric cell includes, in addition to the signal corresponding to the ink patches, first and second control signals of different values representing the standard low-value light intensity and the intensity of the said unmodified light, respectively, said second control signal varying with changes in the characteristics of the photoelectric system comprising said lamp and said photoelectric cell, the apparatus further comprising a control circuit receiving the output of said photoelectric cell and including means responsive to variations in the difference between the values of said first and second control signals to remove from the signal which corresponds to the ink patches the variations due to changes in the characteristics of said photoelectric system, and an electrical indicating instrument connected to respond to the output of the control circuit to indicate changes in the quality of colour reproduction.

6. An apparatus according to claim 5 in which said exposure control means exposes the photoelectric cell to said first standard light source of low intensity and to direct light from the lamp.

7. An apparatus according to claim 5, in which the exposure control means exposes the photoelectric cell to said first standard light source of low intensity and to light originating from the lamp and reflected from parts of the printed surface on which no ink has been deposited, whereby said second control signal varies with changes in the reflectance of said surface and said control circuit removes from the signal corresponding to the ink patches the variations due to changes in the colour of the printed surface before the deposition of ink thereon.

8. An apparatus according to claim 5, in which said exposure control means comprises a rotary shutter which masks the photoelectric cell for part of each rotation, the output of the photoelectric cell during the masked period constituting the said first control signal.

9. An apparatus according to claim 8, including driving means for feeding the printed surface past said scanning head, and means for driving said rotary shutter in synchronism with the movement of the printed surface to mask said photoelectric cell during the movement past the scanning head of picture areas on said printed surface.

10. An apparatus for indicating changes in the quality of colour reproduction in printing with ink of a plurality of colours, comprising a scanning head, including a photoelectric cell which scans a series of patches of the different coloured inks arranged along a track on a moving printed surface to give output signals which represent the reflectance of the patches but which may also be affected by changes in factors unrelated to the reflectance of the said patches, exposure control means for additionally exposing said photoelectric cell to two different standardising light intensities, at least one of which varies in accordance with changes in at least one of the said unrelated factors, whereby the output of said photoelectric cell includes, in addition to the signals corresponding to the said ink patches, two signals of different values representing the said two different light intensities, the different between the two values including variations due to changes in said one unrelated factor, said apparatus further comprising a control circuit receiving the output of the photoelectric cell and including means responsive to said variations in the difference between the values of the two standardising signals to remove from the signals which correspond to the ink patches the variations due to changes in the said one unrelated factor, a plurality of electrical indicating instruments each corresponding to one of said colours, and switching means receiving the output of said control circuit and distributing to said instruments said signals corresponding to the ink patches of corresponding colours, whereby each instrument indicates changes in the quality of reproduction of one of the said colours.

11. An apparatus according to claim 10, in which said switching means includes a plurality of electronic gating circuits, the apparatus further comprising a cold-cathode selector discharge tube controlling said gating circuits, and a trigger circuit controlled by the signal from the photoelectric cell and operating to step the selector discharge tube.

12. An apparatus according to claim 10, in which the output signal from the scanning head is amplified in an electronic amplifier and the output from the amplifier which contains colour pulses each resulting from the light from one of the colour patches on the printing surface is applied to a gating unit containing a first set of gates supplied with gating pulses timed respectively to cause each gate to pass the colour pulses derived from the patches of one colour, a steady potential from the amplifier is applied to a set of separately adjustable setting potentiometers each allocated to one of the colour patches while the adjustable outputs from the said setting potentiometers are applied to the respective gates of a second set of gates supplied with the same gating pulses as the said first set of gates, and the combined output from the first set of gates and that from the second set of gates are fed to a difference amplifier which yields an output consisting only of pulses proportional to the colour pulses in the output from the scanning head, the said setting potentiometers being set so as to make the last-named output independent of the overall amplitude of the signal output from the scanning head.

13. An apparatus according to claim 10, in which the output signal from the scanning head which contains colour pulses each resulting from the light from one of the colour patches on the printing surface is amplified in an electronic amplifier, each colour pulse is clamped to a fixed potential and the resultant pulses fed to a set of gates supplied with gating pulses timed respectively to cause each gate to pass the colour pulses derived from the patches of one colour, the outputs from the respective gates are applied to separately adjustable feed-back potentiometers, the adjustable outputs of which are fed back to the input of the said amplifier and the poteniometers adjusted so that the outputs from the gates are all of the same amplitude.

14. An apparatus according to claim 12, in which the outputs from the different gates are each fed to a separate peak-voltage measuring circuit.

15. An apparatus according to claim 14 comprising in each measuring circuit a condenser connected to receive said colour pulses and which is charged to the peak voltage of the pulse applied to it, said condensers being selectively connected to said electrical indicating instruments.

16. An apparatus according to claim 15, comprising means supplying to each of said measuring circuits timed dunking pulses which discharge said condensers by a small amount between receiving one colour pulse and the next pulse of the same colour.

17. An apparatus according to claim 15 comprising for each measuring circuit an electronic discharge tube connected as a cathode follower, the condenser in each measuring circuit being connected to the control grid of said tube, and further comprising a source of steady stabilized voltage to which the output voltage from said tube is connected through said indicating instrument.

18. An apparatus according to claim 13, in which the colour pulses of equal amplitudes are applied to a diode rectifier biassed to pass only the tips of pulses about a predetermined voltage which tips are applied to a cathode ray indicator tube.

19. An apparatus for indicating changes in the quality of colour reproduction in printing with ink of at least one colour, comprising a scanning head including a lamp and a photoelectric cell which scans patches of the ink on a printed surface illuminated by said lamp to give an output signal which represent the reflectance of the patches but which may also be affected by changes in factors unrelated to the reflectance of the patches, exposure control means which additionally expose said photoelectric cell at different times to a first standard light source of low intensity, representing black level, and to light which originates from the lamp but reaches said photoelectric cell without modification by reflection from an ink patch, and which represents white level, the corresponding white level signal from said photoelectric cell including variations due to changes in the characteristics of the photo electric system comprising said lamp and said photoelectric cell, a control circuit including a circuit for generating a signal representing the difference between said black and white level signals, and an electronic amplifier receiving the output of the photoelectric cell and including an automatic gain control connection fed with said difference signal, whereby variations in the ink-patch signal due to changes in the characteristics of said photoelectric system are removed in said control circuit, and an electrical indicating instrument connected to respond to the output of the control circuit so as to indicate changes in the quality of colour reproduction.

20. An apparatus for indicating changes in the quality of colour reproduction in printing with ink of at least one colour, comprising a scanning head, including a photoelectric cell which scans patches of the ink on a printed surface to give an output signal which represents the reflectance of the patches, exposure control means for additionally exposing said photoelectric cell to two different standardising light intensities, whereby the output of said photoelectric cell includes, in addition to the signal corresponding to the said ink patches, two signals of different values representing the said two different light intensities, an amplifier for amplifying the output of said photoelectric cell, means responsive to variations in the difference between the values of said two standardizing signals to vary the gain of said amplifier, and an electrical indicator connected to respond to the output of said amplifier so as to indicate changes in the quality of colour reproduction.

References Cited in the file of this patent
UNITED STATES PATENTS

| 1,964,365 | Razek et al. | June 26, 1934 |
| 2,164,513 | Gaebel | July 4, 1939 |
| 2,262,573 | Bender | Nov. 11, 1941 |
| 2,548,755 | Vossberg et al. | Apr. 10, 1951 |